US005763774A

United States Patent [19]
Ha et al.

[11] Patent Number: 5,763,774
[45] Date of Patent: Jun. 9, 1998

[54] FLUID FLOW METER WITH REDUCED ORIENTATION SENSITIVITY

[75] Inventors: Don Dongcho Ha, Long Beach, Calif.; Richard F. Blair, Lakewood, Colo.; Jiro Yamasaki, Tokyo, Japan

[73] Assignee: Millipore Corporation, Bedford, Mass.

[21] Appl. No.: 691,061

[22] Filed: Aug. 1, 1996

[51] Int. Cl.[6] ................................................ G01F 5/00
[52] U.S. Cl. ........................................................... 73/202
[58] Field of Search ................................ 73/202, 202.5, 73/204.22, 204.17

[56] References Cited

U.S. PATENT DOCUMENTS

| | | |
|---|---|---|
| 3,559,482 | 2/1971 | Baker et al. .................. 73/202.5 |
| 3,938,384 | 2/1976 | Blair . |
| 4,056,975 | 11/1977 | Lemay . |
| 4,800,754 | 1/1989 | Korpi . |
| 5,191,793 | 3/1993 | Drexel et al. . |
| 5,228,338 | 7/1993 | Saghatchi .......................... 73/202 |

Primary Examiner—Richard Chilcot
Assistant Examiner—Jewel Artis
Attorney, Agent, or Firm—Fulbright & Jaworski LLP

[57] ABSTRACT

A flow meter is adapted to measure the flow rate of a fluid flowing in the interior of a sensing conduit. The flow meter includes one sensor element disposed along the flow path of the fluid externally of the sensing conduit closer to one fluid flow port of the conduit, another sensor element disposed along the flow path of the fluid externally of the sensing conduit closer to the other fluid flow port of the conduit, an elongated structure disposed along the flow path of the fluid internally of the sensing conduit and away from the two sensor elements for reducing the fluid flow space in the sensing conduit, apparatus for heating the sensor elements, and apparatus for detecting a temperature differential between the sensor elements. The elongated structure has an end that engages the sensing conduit at a fluid flow port. The elongated structure may be a wire that is pre-bent or straight prior to its insertion into the sensing conduit, or may be a tube.

32 Claims, 5 Drawing Sheets

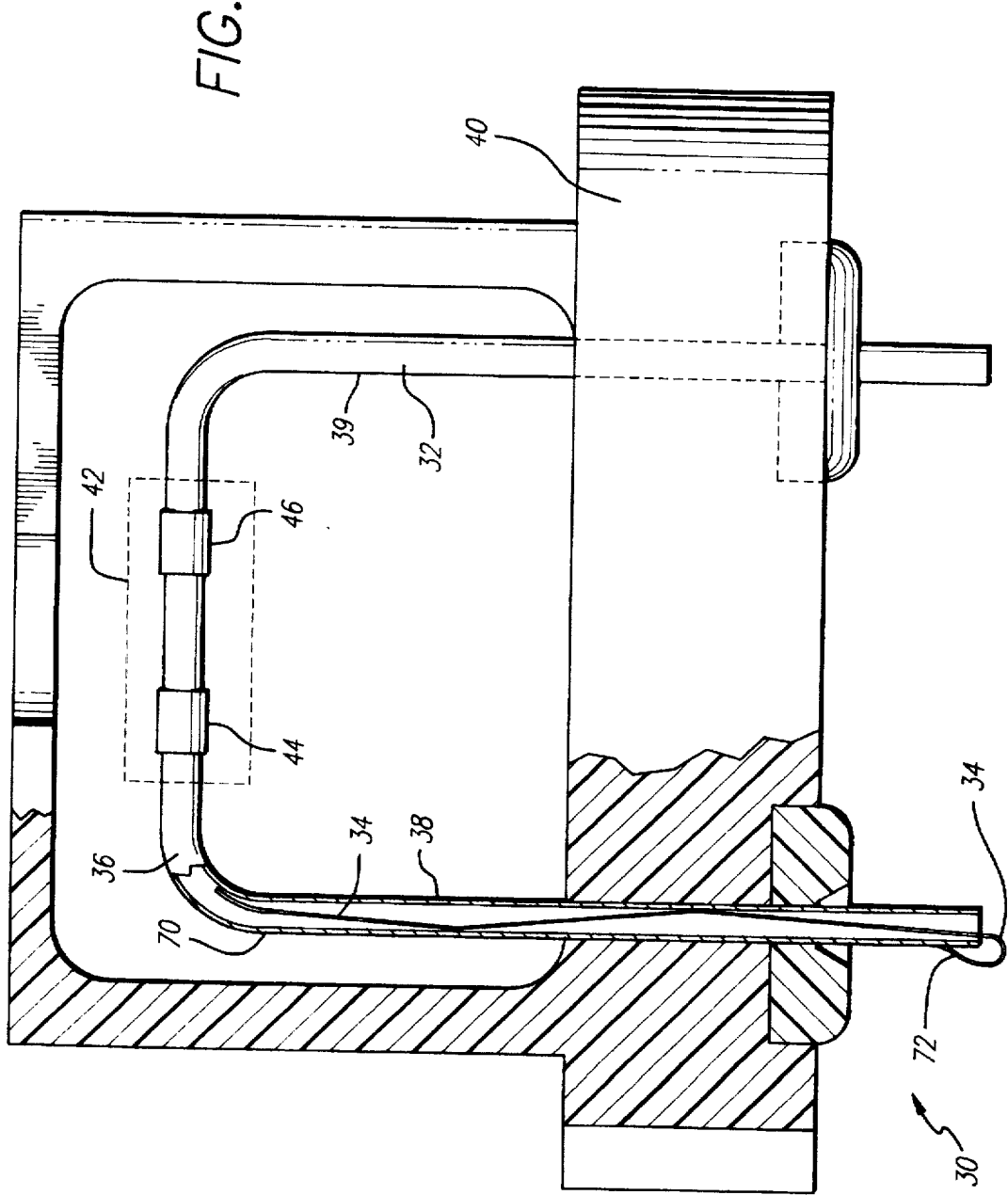

FLUID FLOW METER WITH REDUCED ORIENTATION SENSITIVITY

FIELD OF THE INVENTION

The invention relates generally to the field of sensing and measuring fluid flow.

BACKGROUND OF THE INVENTION

Mass flow meters for gases measure the mass flow rate of a gas, ideally, independently of gas temperature or pressure. Forms of such devices which operate on heat transfer principles have become widely adopted. A common commercial form incorporates a small diameter tube which has two coils of wire wound on the outside in close proximity to each other. The coils are formed from a metallic material having a resistance which is temperature-sensitive.

In a bridge-type electrical circuit, the coils can then be heated by an electrical current to provide equal resistances in the absence of flow of the gas and a balanced condition for the bridge-type circuit—e.g., a null output signal.

Then, with the gas flowing within the tube, within the relevant measuring range of the device, the temperature of the upstream coil is decreased by the cooling effect of the gas and the temperature of the downstream coil is increased by the heat from the upstream coil transmitted by the gas. This difference in temperature is proportional to the number of molecules per unit time flowing through the tube. Therefore, based on the known variation in resistance of the coils with temperature, the output signal of the bridge circuit provides a measure of the gas mass flow.

In various circumstances, forms of heat transfer phenomena can introduce substantial error in the measurements of these mass flow meter devices. U.S. Pat. No. 3,938,384, issued Feb. 17, 1976, U.S. Pat. No. 4,056,975, issued Nov. 8, 1977, and U.S. Pat. No. 5,191,793, issued Mar. 9, 1993, all having the same owner as the Assignee herein, illustrate some of the problems.

One particular problem is sensor calibration shift due to changes in the mounting orientation of the sensor of the mass flow meter and to the effects of changing inlet pressure. In particular, referring to FIG. 1, when the mass flow sensor 10 is mounted at certain orientations, particularly, the more it is oriented vertically, a phenomenon commonly known as thermal siphoning caused by thermal gradients present inside the sensor tube 12 occurs. Initially, when the gas begins to flow within the sensor tube 12, the temperature of the upstream coil 14 is decreased by the cooling effect of the gas and the temperature of the downstream coil 16 is increased by the heat from the upstream coil 14 transmitted by the gas. As the gas inside the sensor tube 12 increases in temperature and rises, however, cooler gas from the bypass element 18 rushes into the sensor tube 12 to replace the warmer, rising gas, causing a forced convection current 20. This forced convection current 20 becomes superimposed on the natural convection current pattern otherwise established within the sensor tube 12 without any vertical orientation, thus causing shifts in zero (change in the null output without a change in actual flow rate through the mass flow meter—i.e., shifting the output to non-zero) and span (the flow rates covered by the relevant measuring range of the meter up to the maximum intended flow rate). As a result, the actual flow measurement thus becomes a function of the inlet pressure and of the nature of the process gas. The thermal siphoning effects on zero and span increase with increasing inlet pressure and gas density.

The Grashof Number (Gr), generally representing free convection heat transfer around the sensor tube, is commonly used to measure the severity of the thermal siphoning problem. The Grashof Number Gr, a dimensionless value, is given by the equation:

$$Gr = g\rho^2 \beta (T_1 - T_0) D^3 / \mu^3 \qquad (1)$$

where $g$=gravitational constant $\rho$=gas density $\beta$=thermal coefficient of volumetric expansion $T_1$=sensor tube wall temperature $T_0$=ambient temperature $D$=internal diameter of sensor tube $\mu$=gas viscosity In general, when the Grashof Number Gr exceeds a certain critical value, determined by the various factors, thermal siphoning occurs. In general, the convection current becomes superimposed on the natural convection pattern, resulting in shifts in zero and span.

One way to minimize the thermal siphoning effect is to actually reduce the internal diameter of the sensor tube. Although this will generally reduce the effects of thermal siphoning, manufacturing a tube having such a small diameter can be difficult and, thus, impractical.

Another way to reduce the thermal siphoning effect is to insert a single wire through the entire length of the sensor tube. Although this approach reduces the internal diameter of the tube, severe linearity problems can be created.

The present invention addresses thermal siphoning in a way that is simple to manufacture and particularly advantageous.

SUMMARY OF THE INVENTION

The present invention provides a flow meter for measuring the flow rate of a fluid flowing in the interior of a sensing conduit having first and second fluid flow ports. The flow meter includes a first sensor element disposed along the flow path of the fluid externally of the sensing conduit closer to the first fluid flow port and a second sensor element disposed along the flow path of the fluid externally of the sensing conduit closer to the second fluid flow port, an elongated structure disposed along the flow path of the fluid internally of the sensing conduit and away from the first and second sensor elements for reducing the fluid flow space in the sensing conduit, apparatus for heating the sensor elements, and apparatus for detecting a temperature differential between the sensor elements.

In another aspect, the flow meter includes a first sensor element positioned along the flow path of the fluid externally of the sensing conduit closer to one of the fluid flow ports for measuring the temperature of the first sensor element as modified by the fluid flow and a second sensor element positioned along the flow path of the fluid externally of the sensing conduit closer to the other of the fluid flow ports for measuring the temperature of the second sensor element as modified by the fluid flow, an elongated structure positioned along the flow path of the fluid internally of the sensing conduit and terminating adjacent to the first sensor element for reducing the flow space in the sensing conduit, apparatus for heating the sensor elements, and apparatus for detecting a temperature differential between the sensor elements.

In still another aspect, the present invention provides a flow sensor including a sensing conduit to carry a fluid flow to be measured therethrough, a sensor element mounted on the sensing conduit, and an elongated structure positioned along the flow path of the fluid internally of the sensing conduit and terminating adjacent to the sensor element for reducing the fluid flow space in the sensing conduit.

The foregoing and additional features and advantages of this invention will become apparent from the detailed description and accompanying drawing figures that follow. In the figures and the written description, numerals indicate the various features of the invention, like numerals referring to like features throughout for both the drawing figures and the written description.

BRIEF DESCRIPTION OF THE DRAWINGS

FIG. 2 is a front, cross-sectional view of a mass flow sensor device, including a sensing conduit having a wire disposed therein, constructed in accordance with the present invention;

DETAILED DESCRIPTION

Figure 1:
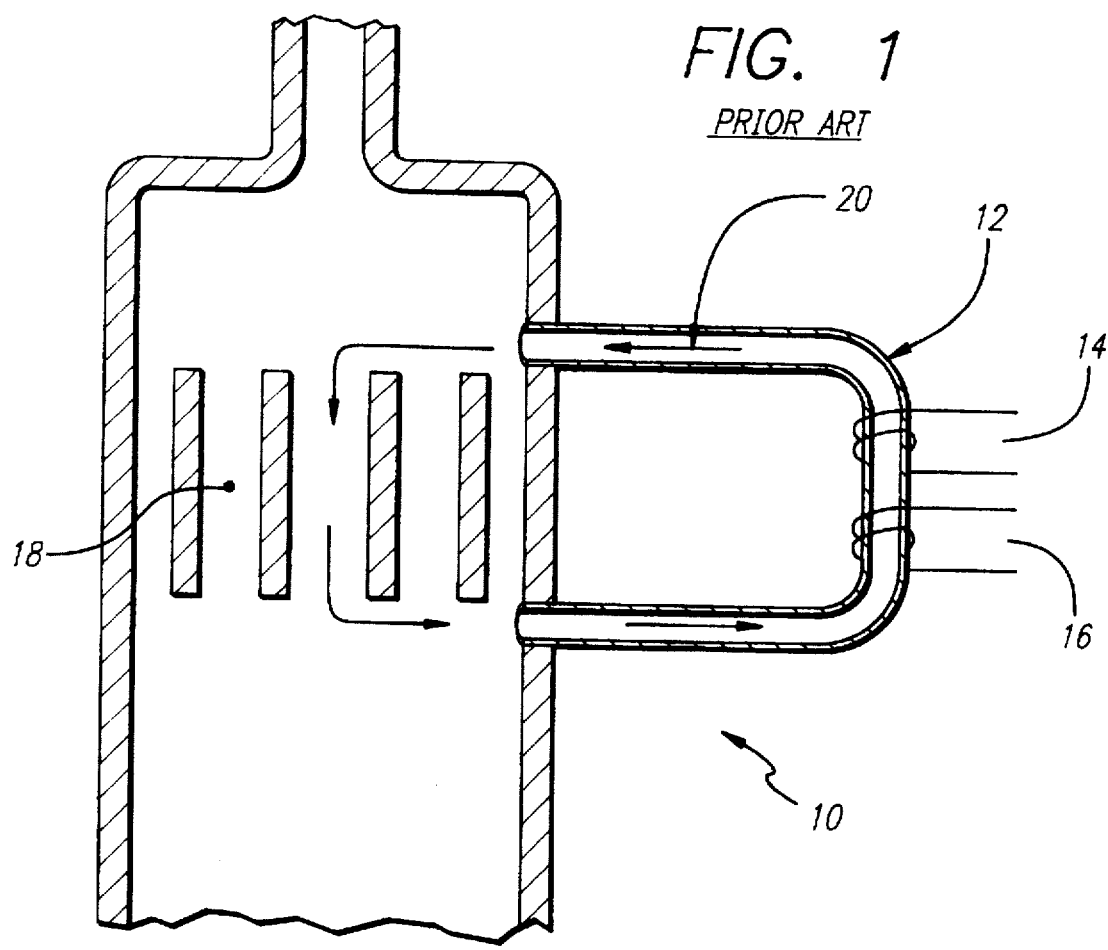
FIG. 1 is a front, schematic, cross-sectional view showing a conventional mass flow sensor device mounted in a vertical orientation.

Referring to FIG. 2, there is shown generally a mass flow sensor 30, including a sensing conduit 32 having a wire 34 disposed therein, for measuring the flow rate of a fluid flowing in the interior 36 of the sensing conduit 32, constructed in accordance with the present invention. As will be further noted and hereinafter more fully described, a single wire 34 inserted in the upstream portion 38 of the sensing conduit 32 reduces the effective internal flow diameter for that portion, thereby reducing the magnitude of the Grashof Number Gr, described in Eq. (1). Arrangements in accordance with the present invention may also include a wire inserted in the downstream portion 39. When the mass flow sensor 30 is oriented with a vertical aspect and with the upstream coil above, there generally is more enhanced performance with a wire mounted in the upstream portion 38, as opposed to the downstream portion. Additionally, however, arrangements in accordance with the present invention may also be adapted to include a wire in both the upstream and downstream portions 38 and 39 of the sensing conduit 32, with neither wire coming into contact with the thermal sensing area 42 for the sensing conduit 32.

Figure 6:
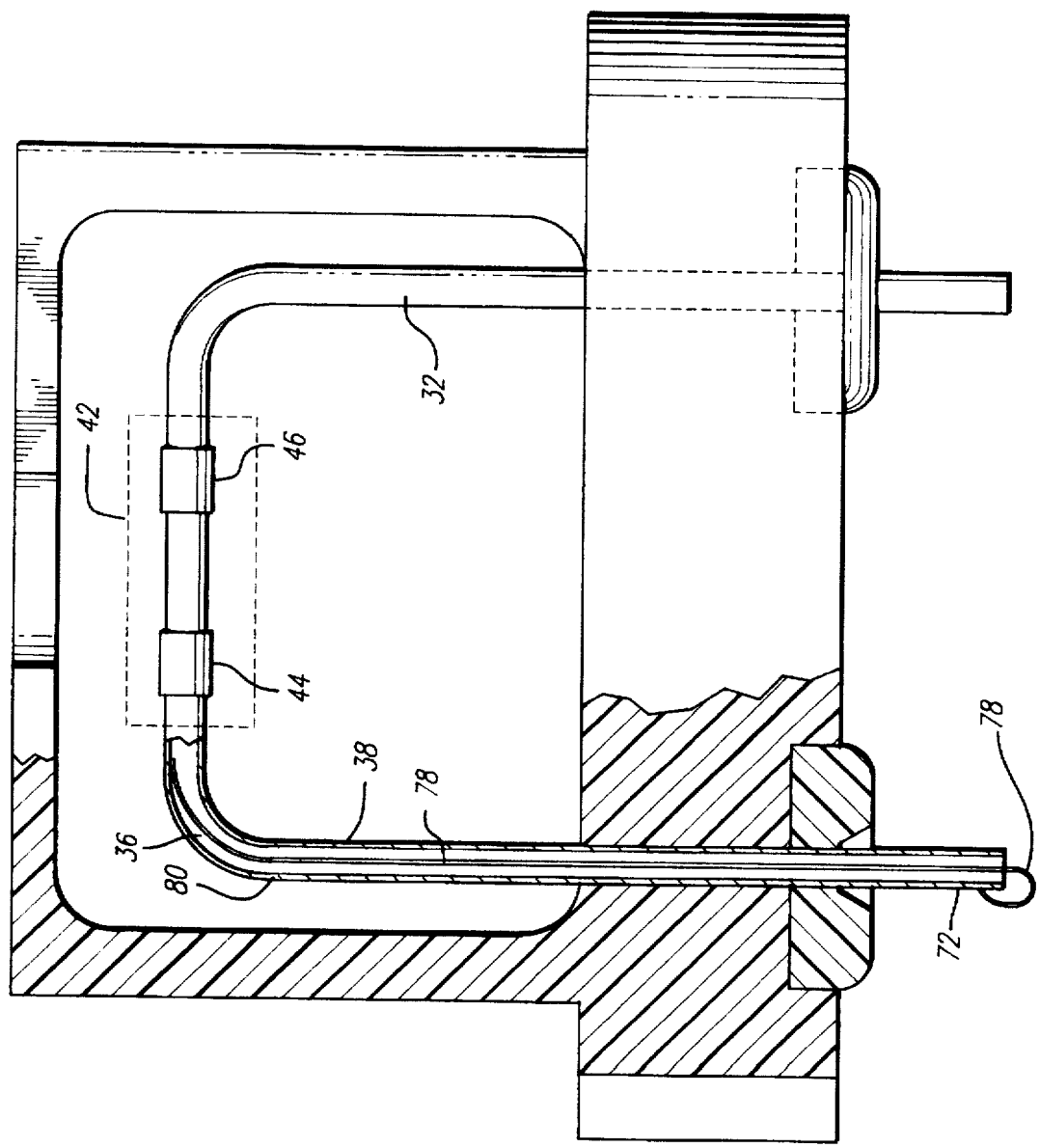
FIG. 6 is a front, cross-sectional view of an alternative embodiment of a mass flow sensor device, including a sensing conduit having a wire disposed therein, constructed in accordance with the invention.

In accordance with an advantage of the present invention, the thermal siphoning effect is reduced, thereby allowing for improved sensing for gas flow measurement. The sensing conduit 32, in a housing 40, has a thermal sensing area 42 having disposed therein generally identical upstream and downstream coils 44 and 46 formed of temperature-sensitive resistance material wound around the outside of the sensing conduit 32. In accordance with an advantage of the present invention, the wire, which may be pre-bent as shown in FIG. 2 or straight as represented in FIG. 6, prior to insertion, is of a length such that when inserted in place within the sensing conduit 32, it does not come into contact with the thermal sensing area 42 in the sensing conduit 32, thereby eliminating the possibility of upsetting the balanced and symmetrical heat transfer through the wall of the flow conduit. Linearity problems which may be caused by a wire contacting the thermal sensing area 42 are thus minimized.

Figure 4:
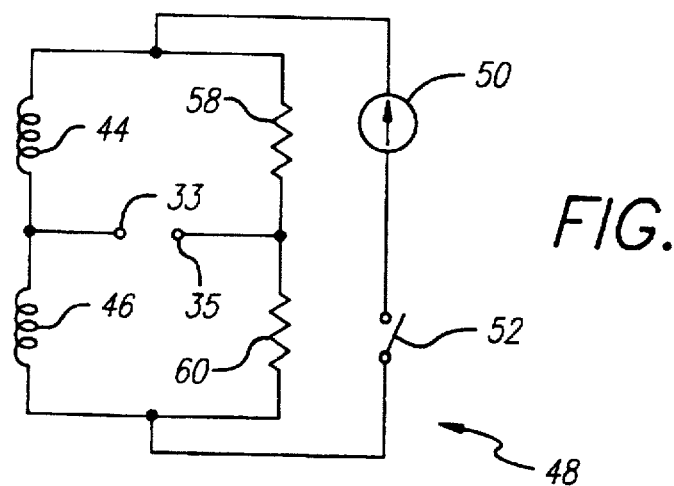
FIG. 4 is schematic view showing sensor coils of the mass flow sensor device of FIG. 2 in a bridge-type circuit.

The mass flow sensor 30 is adapted to operate with the upstream and downstream coils 44 and 46 connected in a bridge-type circuit. A simple example of such a circuit 48, with the coils 44 and 46 disposed therein, is illustrated in FIG. 4. The present invention is not limited, however, to the bridge-type electrical circuit 48 illustrated in FIG. 4. Rather the present invention may be adapted to operate with a variety of other bridge-type circuits known in the art. Referring to FIG. 4, as is well known by one skilled in the art, in operation, a dc current source 50, after a switch 52 is closed, with no gas flowing through the sensing conduit (not shown), establishes a base output voltage between two output terminals 33 and 35 of the circuit 48. The current flows through the coils 44 and 46 and heats the wires of the coils 44 and 46 to equal levels, establishing the same temperature in the two coils 44 and 46. With the two bridge resistors 58 and 60 having equal resistances, the base output voltage, then, of course, is zero and the bridge-type circuit 48 is balanced.

With gas flow, however, the upstream coil 44 is cooled by gas flow, giving up some of its heat to the gas flowing by, and the downstream coil 46 is heated, taking some of this heat that was given to the gas. Therefore, a temperature differential is established between the coils 44 and 46, resulting in a voltage across the output terminals 33 and 35. The voltage is due to the change in resistance of the coils 44 and 46 with temperature.

The temperature difference between the coils 44 and 46, within the range of the mass flow sensor 30, is a measure of the number of gas molecules, and thus of the mass of the gas, flowing through the sensing conduit 32. The difference in the resistance of the coils 44 and 46, similarly, is a measure of the difference in temperature between the coils 44 and 46. With the output voltage determined by this difference in resistance, the output voltage then becomes a measure of the mass flow rate of the gas.

To provide an output voltage which is proportional to the difference between the resistances of the coils 44 and 46, the two bridge resistors 58 and 60 should have much larger resistances than the resistances of the coils 44 and 46. Further, to make the bridge circuit 48 accurate over a wide variety of temperatures, the current source 50 and the bridge resistors 58 and 60 should incorporate temperature independence for the variety of temperatures.

As indicated, bridge-type circuits, including variations to implement independence of various environmental conditions, are well known and well understood. There, of course, is a concern here for coil material for the circuit 48 having a resistance which is proportional to temperature and for coils 44 and 46, of this material, providing temperature differences which are proportional to mass flow rate. In this regard, typically, well outside the range of the mass flow rate sensor, the flow of the gas will become sufficiently fast to cool both the upstream and the downstream coils 44 and 46.

The sensing conduit is advantageously made of a stainless steel material coated with a polyurethane material to provide good electrical insulation before the coils 44 and 46 are wound around the conduit. Coils, e.g. made of Balco, coated with a thin layer of an electrically insulating enamel known as Pyre-ml (these being designations of Amax Metals), are convenient and satisfactory. Each coil might typically include two layers, e.g., an inner layer wound from the outside in and an outer layer wound on top of the inner layer from the inside out, with the two leads for connection to a bridge-type circuit, as in FIG. 4, leading from the outside of the coil.

As illustrated in FIG. 2, the sensing conduit 32 is disposed in a housing 40, which may be of an ordinary type, or of a special type, such as a housing having a wall structure closely spaced along the sensors to limit attitude sensitive convection outside the conduit within the housing. Typically, the housing may have a base having walls that are shown in the cross-sectional view in FIG. 2, and a cover (not shown) that press-fits to close the cavity in the base for the U-shaped portion of the sensing conduit. One skilled in the art will recognize that the present invention may be adapted to operate with a variety of housing structures known in the art, e.g., made of polymers, fiber-filled polymers, such as glass or carbon-filled, metals, as well as other materials.

The sort of interaction between the gas and the coils 44 and 46 of concern here is also well understood, as indicated by, e.g., the Assignee's prior U.S. Pat. Nos. 3,938,384, issued Feb. 17, 1976, 4,056,975, issued Nov. 8, 1977, and 5,191,793, issued Mar. 9, 1993. The last of these provides examples of the above-referenced special types of housing.

Figure 5:
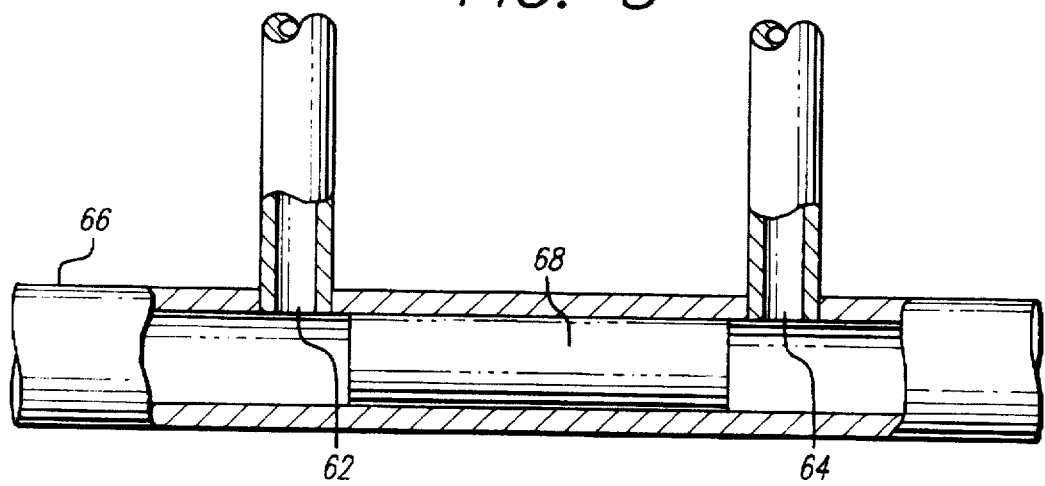
FIG. 5 illustrates, somewhat schematically, the use of the mass flow sensor device of FIG. 2 with a primary conduit.

By way of further introductory background, in FIG. 5, somewhat schematically, the input and output ports 62 and 64 of the mass flow sensor 30 are shown in communication with a primary conduit 66 having a pressure drop device 68 therein. In a typical actual (non-schematic) arrangement (not shown), the sensor 30 is mounted so that the end of the sensing conduit 32 near the input port 62 of the conduit is disposed in a transverse upstream opening to the fluid flow through the primary conduit 66. Similarly, the end of the sensing conduit near the output port 64 of the conduit is disposed in another, transverse downstream opening to such fluid flow. Referring to the somewhat schematic representation of FIG. 5, with the primary conduit 66 inserted in a gas flow system (having one or more pressure drop devices 68 for adjusting gas flow), the mass flow sensor 30 can be provided with changes in calibration—i.e., in a ratio between the mass flow rate through it and through the primary conduit 66 and system. This sort of technique, also discussed in the aforementioned patents, is also well known and well understood. In accordance with well understood gas flow principles, the pressure drop device 68 should be such that the fluid flow characteristics in the primary conduit 66, near the sensing conduit input and output ports 62 and 64, and in the sensing conduit 32, are proportional. In large part, this means choosing the pressure drop device such that laminar flow is maintained in both the primary conduit 66, in this vicinity, and in the sensing conduit 32 (as opposed to turbulent flow).

With this introduction and background, the aspects and details of the device of FIGS. 2 through 6 which are of primary concern for present purposes, can be focused upon and understood in their context. Such details, to a substantial degree, concern the wire 34 disposed in the interior 36 and upstream portion 38 of the conduit 32, outside of the thermal sensing area 42, for reducing the fluid flow area, within the upstream portion of the conduit, thereby minimizing the thermal siphoning effect, and related alternative aspects.

Figure 3:
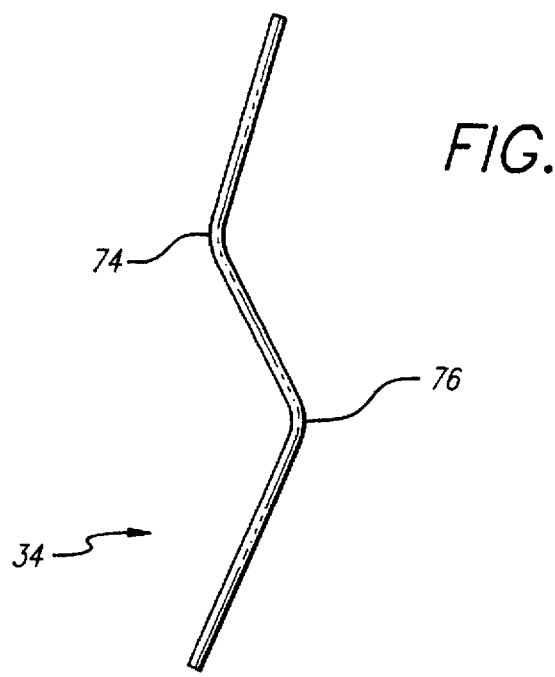
FIG. 3 is an enlarged view showing the wire of the mass flow sensor device of FIG. 2 prior to the inserting and positioning of the wire in the sensing conduit.

Referring now more specifically to FIGS. 2 and 3, the wire 34, which in the embodiment shown, has a circular cross-section, is illustrated in further detail. As will further be noted and hereinafter more fully described, the wire 34 inserted in the sensing conduit 32, where it is present, reduces the effective internal flow diameter, thereby reducing the magnitude of the Grashof Number Gr. This effective internal diameter can be considered to be the internal diameter which a circular tube, having a clear opening, would have in order to provide the same cross-sectional area for gas flow. As a result, the thermal siphoning effect is reduced, thereby allowing for improved sensing for gas flow measurement.

In the embodiment of FIG. 2, the wire 34 is bent at two places utilizing conventional manufacturing techniques prior to insertion into the upstream 38, interior portion 36 of the sensing conduit 32. The wire 34 is thus pre-bent to be resiliently spring biased outward so that when the wire 34 is inserted in the sensing conduit 32, the bends provide sufficient force to retain the wire 34 in position. One end of the wire 34 is disposed in an upper region 70 of the upstream portion 38 of the sensing conduit 32, outside of the thermal sensing area 42. The other end of the wire 34, the exposed end, extends out of the sensing conduit 32 and then is rolled outwardly sufficiently to engage a portion of the outer perimeter 72 of the sensing conduit 32, thus further retaining the wire 34 in position as illustrated in FIGS. 2 and 3. The result is greater stability of position of the wire against the effects of differential pressure that will arise within the sensing conduit 32. The wire 34 in the present invention, more generally, thus may be bent at one or more points prior to insertion to form one or more corresponding convex contact points which engage the inner circumference of the sensing conduit 32 when the wire 34 is inserted.

Referring in particular to FIG. 3, showing the wire of FIG. 2 prior to insertion and positioning in the sensing conduit 32, the wire 34 is bent at two locations 74 and 76 each having an approximate angle of 120°. One skilled in the art will recognize that the present invention is not limited to the two-bend or angle configuration illustrated in FIGS. 2 and 3. Rather, in certain situations, such as for a sensing conduit having a very small diameter, a wire having a single bend may be preferred. Correspondingly, in other situations, such as for a sensing conduit having a very large diameter, a wire having multiple bends may be preferred. For the latter situation, a wire may be bent into an elongated zigzag pattern, e.g., four or more substantially straight wire sections separated by, e.g., three or more bends prior to insertion.

The wire 34 is preferably manufactured from a material which allows it to be both permanently bent at one or more locations and also flexible enough to allow it to be removed from the sensing conduit 32 without permanently damaging or deforming the sensing conduit 32. Stainless steel materials, generally, and alloys such as that sold under the name Hastelloy and that sold under the name Monel, may typically be used as the wire material.

In a typical configuration, particularly adapted for non-corrosive gases, which do not tend to accumulate corrosion material which might affect the internal diameter of the sensing conduit 32 over time, the sensing conduit 32 has an outer diameter of approximately 14 mils (wall thickness of approximately 2 mils). The wire 34, then, is of a length such that when inserted in place within the sensing conduit 32, it does not reach the thermal sensing area 42 in the sensing conduit 32. In such a configuration, a diameter for the wire of approximately 7 to 8 mils is convenient and effective. For a conduit length from the input port to the upstream edge of the upstream coil of approximately 1.1 inches, a total wire length of approximately 0.75 inch, approximately 0.7 inches of which are disposed inside the sensing conduit 32, having two bends, each having an approximate angle of 12°, is convenient and effective. However, this may readily vary, depending upon specific requirements and considerations.

In another typical configuration, particularly adapted for corrosive gases, the sensing conduit 32 has an outer diameter of approximately 30 mils (wall thickness of approximately 2.5 mils). Once again, the wire 34 is of a length such that when inserted in place within the sensing conduit 32, it does not come into contact with the thermal sensing area 42 in the sensing conduit 32. In such a configuration, a diameter for the wire of approximately 16 to 19 mils is convenient and effective. For a conduit length from the input port to the upstream edge of the upstream coil of approximately 1.1 inches, a wire length of approximately 0.75 inches, approximately 0.7 inch of which are disposed inside the sensing conduit 32, having two bends, each having an approximate angle of 120°, is convenient and effective. Again, however, this may readily vary.

As an example, coils 44 and 46 of approximately 0.125 inch in length can conveniently be provided in each of the above configurations, with the diameter of the coil wire being approximately 0.6 mil. As indicated, one skilled in the art will recognize that the present invention is not limited to the dimensions or geometrical configurations specifically referred to above. Rather, the insertion of a wire, partially through a sensing conduit, may be adapted for sensing conduits of different diameters and lengths, and coils or other sensors of varying lengths.

Referring to FIG. 6, in accordance with another embodiment, the wire 78, initially generally unbent, is precut to length such that when inserted into the upstream portion 38 of the sensing conduit 32, one end of the wire 78 engages the radiused portion 80 of the sensing conduit 32 and is bent upon engagement. As a result, the forced bend along the radiused portion 80 acts as a spring element and provides sufficient force to hold the wire 78 in place within the interior 36 of the sensing conduit 32. While disposed in the upper region of the upstream portion 38 of the sensing conduit 32, the wire 78 does not, however, come into contact with the thermal sensing area 42. The other end of the wire 78, the exposed end, extends downwardly and then is rolled outwardly sufficiently to engage a portion of the outer perimeter 72 of the sensing conduit 32, thus retaining the wire 78 in position as illustrated in FIG. 6. The wire 78 is thus disposed along the upstream portion 38 of the sensing conduit 32 and is bent upon engagement with the radiused portion 80 of the sensing conduit 32.

In accordance with the present invention, the non-prebent wire 78 illustrated in FIG. 6, although generally easier to prepare and install, may not be as solidly attached within the sensing conduit 32 as the pre-bent wire 34 illustrated in FIG. 2. In certain circumstances, looseness of the wire in the sensing conduit 32, of course, could cause variations in sensing accuracy.

In a typical configuration of the embodiment illustrated in FIG. 6, particularly adapted for non-corrosive gases which do not tend to accumulate corrosion material which might affect the internal diameter of the sensing conduit 32 over time, the sensing conduit 32 has an outer diameter of approximately 14 mils (wall thickness of approximately 2.0 mils). The wire 78, then, is of a length such that when inserted in place within the sensing conduit 32, it does not reach the thermal sensing area 42 in the sensing conduit 32. In such a configuration, a diameter for the wire of approximately 7 to 8 mils is convenient and effective. For a conduit length from the input port to the upstream edge of the upstream coil of approximately 1.1 inches, a total wire length of approximately 1.1 inches, approximately 1.05 inches of which are disposed inside the sensing conduit 32, is convenient and effective.

In another typical configuration, particularly adapted for corrosive gases, the sensing conduit 32 has an outer diameter of approximately 30 mils (wall thickness of approximately 2.5 mils). Once again, the wire 78 is of a length such that when inserted in place within the sensing conduit 32, it does not come into contact with the thermal sensing area 42 in the sensing conduit 32. In such a configuration, a diameter for the wire of approximately 16 to 19 mils is convenient and effective. For a conduit length from the input port to the upstream coil of approximately 1.1 inches, a total wire length of approximately 1.1 inches, approximately 1.05 inches of which are disposed inside the sensing conduit 32, is convenient and effective. Again, however, this may readily vary.

As before, coils 44 and 46 of approximately 0.125 inch in length can be provided in each of these configurations, with the diameter of the coil wire being approximately 0.6 mils.

In accordance with the present invention, the wire illustrated in FIGS. 2 or 6 is disposed along the flow path of the fluid internally of the sensing conduit 32 and away from the coils 44 and 46 for reducing the fluid flow space in the sensing conduit 32. The wire should typically terminate greater than or equal to about one-quarter the length of coil 44 or 46, away from the outer edge of coil 44 or 46. However, terminating greater than or equal to about the length of the coil 44 or 46, away from the outer edge coil 44 or 46 is another convenient and effective alternative.

In accordance with the present invention, when the wire illustrated in FIGS. 2 or 6 is inserted into the sensing conduit 32, the internal diameter of the sensing conduit 32 is effectively reduced along the portion in which the wire is disposed, thereby reducing the magnitude of the Grashof Number Gr. As a result, thermal siphoning can be suppressed. When the wire is not inserted in the mass flow sensor 30, the forced convection current from a non-horizontal orientation, typically becomes a significant factor, superimposed on the natural convection pattern otherwise established within the sensing conduit without the non-horizontal orientation, resulting in shifts in zero and span. The actual flow measured then becomes a function of the inlet pressure and the nature of the process gas. However, when the wire is inserted in the mass flow sensor 30 of the present invention, thus effectively reducing the internal flow area along the portion where the wire is present, the value of the Grashof Number Gr can readily be reduced by a factor of approximately 2.7. Problems caused by thermal siphoning, thus, may be substantially reduced.

Figure 7:
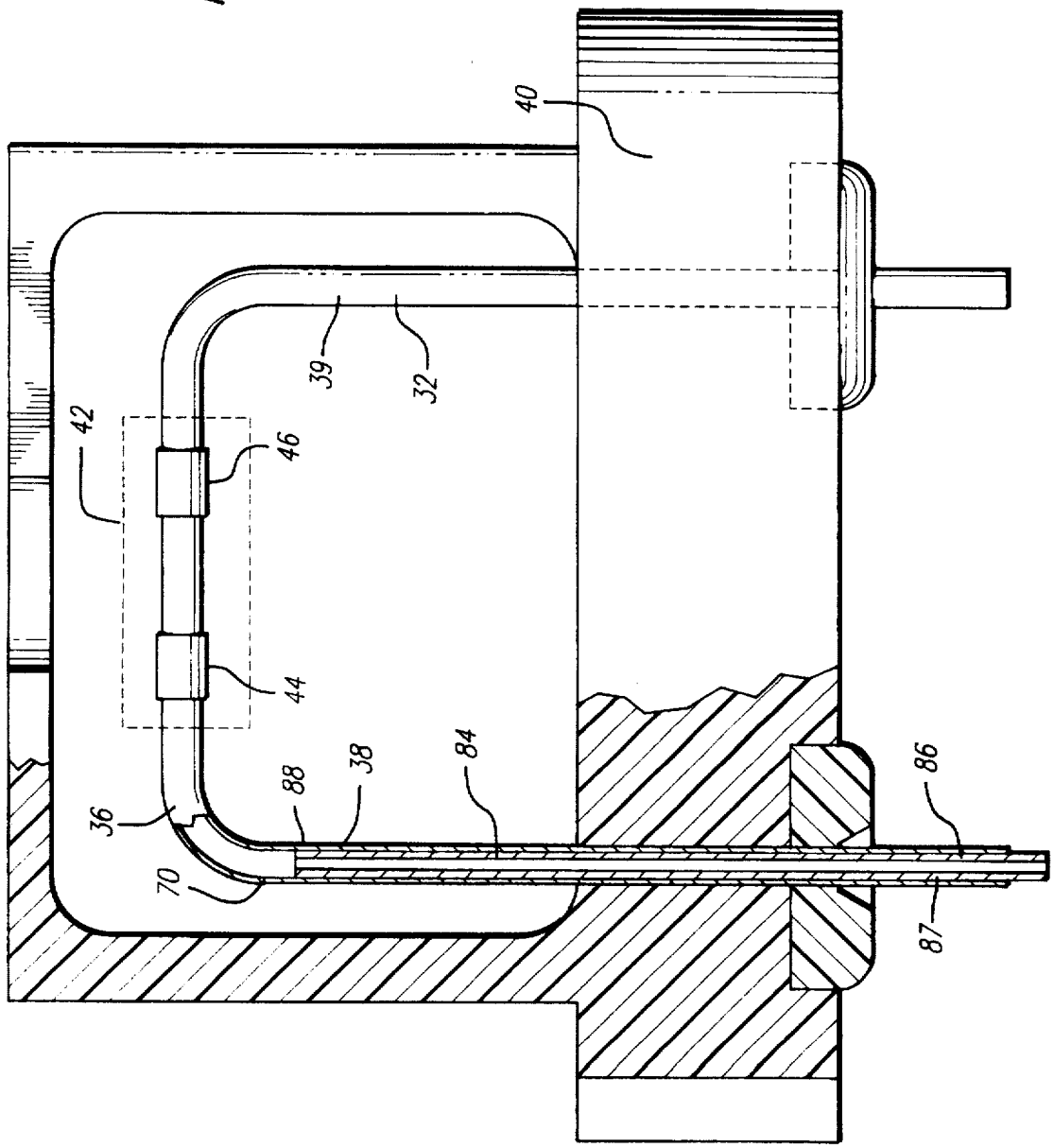
FIG. 7 is a front, cross-sectional view of an alternative embodiment of a mass flow sensor device, including a sensing conduit having a tube disposed therein, constructed in accordance with the invention.

Referring to FIG. 7, in accordance with another embodiment of the invention, a tube 84, rather than a wire as illustrated in FIGS. 2 and 6, is disposed in the interior 36 and upstream portion 38 of the conduit 32, outside of the thermal sensing area 42, for reducing the fluid flow area, within the upstream portion 38 of the conduit 32, thereby reducing the thermal siphoning effect. The tube 84 has a stepped, increased outer diameter portion at the lower end 86 of the conduit 32 (not shown), thus allowing it to be interference or press fitted into the interior 36 of the conduit 32 when inserted. The tube 84, having a hollow center portion, is configured with this increased diameter portion at one end 86 thereof utilizing conventional manufacturing techniques prior to insertion into the sensing conduit 32. The increased diameter at the lower end of the tube 84, provides sufficient force to retain the tube 84 in position. Simply for purposes of illustration, the step to the increased diameter is assumed to occur at a step location 87 along the tube and to continue to the end of the downstream end of the tube. The tube 84 terminates in the upper region 70 of the upstream portion 38 of the sensing conduit 32, before the radiused portion of the conduit 32 and outside of the thermal sensing area 42. The other end 88 of the tube 84, the end not having the increased outer diameter, extends downwardly and is not interference fitted. The result of the interference fit at one end is good stability of position of the tube 84 against resistance to the effects of differential pressure that will arise within the sensing conduit 32. One skilled in the art will recognize that the tube may be retained within the sensing conduit by other means, such as by mechanically engaging the tube at the lower end to the conduit.

The configuration shown in FIG. 7 is particularly beneficial for a sensing conduit having a relatively large diameter. Arrangements in accordance with the present invention may also include a tube inserted in the downstream portion 39. When the mass flow is oriented with a vertical aspect and with the upstream coil above, there generally is more enhanced performance with a tube mounted in the upstream portion 38, as opposed to the downstream portion. Additionally, however, arrangements in accordance with the present invention may also be adapted to include a tube in both the upstream and downstream portions 38 and 39 of the sensing conduit 32, with neither tube coming into contact with thermal sensing area 42 for the sensing conduit 32.

The tube 84 is preferably manufactured from a material which allows it to be accurately configured at a desired diameter and also flexible enough to allow it to be removed from the sensing conduit 32 without permanently damaging or deforming the sensing conduit 32. Stainless steel materials may typically be used as the tube material.

In a typical configuration, particularly adapted for either corrosive or non-corrosive gases, the sensing conduit 32 might have an outer diameter of approximately 40.0 mils (wall thickness of approximately 2.5 mil). The tube 84, then, would be of a length such that when inserted in place within the sensing conduit 32, it does not reach the thermal sensing area 42 in the sensing conduit 32, and, in fact, would not reach the radiused portion of the sensing conduit. In such a configuration, an outer diameter for the tube 84 of approximately 34 mils with an increased diameter at the lower end 86 of approximately 36 mils would be convenient and effective. However, this may readily vary, depending upon specific requirements and considerations.

As an example, coils 44 and 46 of approximately 0.125 inch in length can conveniently be provided in the above configuration, with the diameter of the coil wire being approximately 0.6 mil. As indicated, one skilled in the art will recognize that the present invention is not limited to the dimensions or geometrical configurations specifically referred to above. Rather, the insertion of a tube, partially through a sensing conduit, may be adapted for sensing conduits of different diameters and lengths, and coils or other sensors of varying lengths.

It, of course, will be appreciated by those skilled in the art that many modifications and variations may be made in what has been specifically described without departing from the scope or spirit of the invention. By way of example, the applicable considerations also apply equally well to forms of flow sensors which employ upstream and downstream sensor coils which are heated by a heater coil about the conduit, therebetween. By way of further example, such considerations also apply to forms of flow sensors having thermocouples as upstream and downstream sensors to measure temperature differences along a conduit which is internally heated by electrical current. These other forms, as indicated, are merely exemplary. Accordingly, the scope of the invention shall not be referenced to the disclosed embodiments, but on the contrary, shall be determined in accordance with the claims that follow.

What is claimed is:

1. A flow meter for measuring the flow rate of a fluid flowing in the interior of a sensing conduit having first and second fluid flow ports, comprising:

a first sensor element disposed along the flow path of said fluid externally of said sensing conduit closer to said first fluid flow port and a second sensor element disposed along the flow path of said fluid externally of said sensing conduit closer to said second fluid flow port;

an elongated structure disposed along the flow path of said fluid internally of said sensing conduit and away from said first and second sensor elements for reducing the fluid flow space in said sensing conduit;

means for heating said sensor elements; and means for detecting a temperature differential between said sensor elements.

2. The flow meter claimed in claim 1, wherein said elongated structure further comprises:

a first end disposed along the fluid flow path terminating away from said first sensor element.

3. The flow meter claimed in claim 2, wherein said elongated structure further comprises:

a second end engaged with said sensing conduit substantially at said first fluid flow port.

4. The flow meter claimed in claim 3, wherein said second end of said elongated structure is rolled outward sufficiently to engage a portion of the outer perimeter of said sensing conduit.

5. The flow meter claimed in claim 1, wherein said elongated structure is manufactured from a material which allows it to be both permanently bent at one or more locations and flexible enough to allow it to be removed from said sensing conduit without deforming said sensing conduit.

6. The flow meter claimed in claim 3, wherein said elongated structure is bent between said first and second ends such that said elongated structure is spring biased outwardly when disposed within said sensing conduit for retaining said elongated structure in position.

7. The flow meter claimed in claim 1, wherein said elongated structure is bent in one or more locations prior to insertion in said sensing conduit.

8. The flow meter claimed in claim 1, wherein each sensor element comprises a heating and temperature-sensing coil.

9. The flow meter claimed in claim 3, wherein said first end of said elongated structure terminates greater than or equal to about one-quarter the length of said first sensor element, away from said first sensor element.

10. The flow meter claimed in claim 3, wherein said first end of said elongated structure terminates greater than or equal to about the length of said first sensor element, away from said first sensor element.

11. The flow meter claimed in claim 1, wherein said elongated structure comprises a wire.

12. The flow meter claimed in claim 1, where said elongated structure comprises a tube.

13. A flow meter for measuring the flow rate of a fluid flowing in the interior of a sensing conduit having a pair of fluid flow ports, comprising:

a first sensor element positioned along the flow path of said fluid externally of said sensing conduit closer to one of said fluid flow ports for measuring the temperature of said first sensor element as modified by said fluid flow and a second sensor element positioned along the flow path of said fluid externally of said sensing conduit closer to said other of said fluid flow ports for measuring the temperature of said second sensor element as modified by said fluid flow;

an elongated structure positioned along the flow path of said fluid internally of said sensing conduit and terminating adjacent to said first sensor element for reducing the flow space in said sensing conduit;

means for heating said sensor elements; and means for detecting a temperature differential between said first and second sensor elements.

14. The flow meter claimed in claim 13, wherein said elongated structure is deformed such that it is biased against the inside of said sensing conduit for retaining said structure in position within said sensing conduit.

15. The flow meter claimed in claim 13, wherein said elongated structure is deformed in one or more locations prior to insertion in said sensing conduit.

16. The flow meter claimed in claim 13, wherein said elongated structure is manufactured from a material which allows it to be both permanently deformed in one or more locations and flexible enough to allow it to be removed from said sensing conduit without deforming said sensing conduit.

17. The flow meter claimed in claim 13, wherein each sensor element comprises a heating and temperature-sensing coil.

18. The flow meter claimed in claim 13, wherein said elongated structure comprises a first end terminating greater than or equal to about one-quarter the length of said first sensor element, away from said first sensor element.

19. The flow meter claimed in claim 18, wherein said first end of said elongated structure terminates greater than or equal to about the length of said first sensor element, away from said first sensor element.

20. The flow meter claimed in claim 13, wherein said elongated structure comprises a wire.

21. The flow meter claimed in claim 13, wherein said elongated structure comprises a tube.

22. A flow meter, comprising:

a sensing conduit to carry a fluid flow to be measured therethrough;

a sensor element mounted on said sensing conduit; and an elongated structure positioned along the flow path of said fluid internally of said sensing conduit and terminating adjacent to said sensor element for reducing the fluid flow space in said sensing conduit.

23. The flow meter claimed in claim 22, wherein said elongated structure is deformed such that it is biased against the inside of said sensing conduit for retaining said elongated structure in position within said sensing conduit.

24. The flow meter claimed in claim 22, wherein said elongated structure is deformed in one or more locations prior to insertion in said sensing conduit.

25. The flow meter claimed in claim 22, wherein said elongated structure is manufactured from a material which allows it to be both permanently deformed in one or more locations and flexible enough to allow it to be removed from said sensing conduit without deforming said sensing conduit.

26. The flow meter claimed in claim 25, wherein said elongated structure is manufactured from a stainless steel material.

27. The flow meter claimed in claim 26, wherein said sensor comprises a heating and temperature-sensing coil.

28. The mass flow sensor claimed in claim 27, wherein said elongated structure comprises a first end, terminating greater than or equal to about one-quarter the length of said first sensor element, away from said first sensor element.

29. The mass flow sensor claimed in claim 28, wherein said first end of said elongated structure terminates greater than or equal to about the length of said first sensor element, away from said first sensor element.

30. The flow meter claimed in claim 29, wherein said elongated structure comprises a wire.

31. The flow meter claimed in claim 30, wherein said elongated structure comprises a tube.

32. The flow meter claimed in claim 1, wherein said first and second sensor elements are mounted on said conduit.

* * * * *